US012134543B2

(12) United States Patent
Husmann

(10) Patent No.: US 12,134,543 B2
(45) Date of Patent: Nov. 5, 2024

(54) ELEVATOR SYSTEM ARRANGEMENT HAVING AN ELEVATOR BRAKE DEVICE

(71) Applicant: Inventio AG, Hergiswil (CH)

(72) Inventor: Josef Husmann, Lucerne (CH)

(73) Assignee: INVENTIO AG, Hergiswil (CH)

( * ) Notice: Subject to any disclaimer, the term of this patent is extended or adjusted under 35 U.S.C. 154(b) by 253 days.

(21) Appl. No.: 17/309,575

(22) PCT Filed: Dec. 2, 2019

(86) PCT No.: PCT/EP2019/083351
§ 371 (c)(1),
(2) Date: Jun. 7, 2021

(87) PCT Pub. No.: WO2020/126445
PCT Pub. Date: Jun. 25, 2020

(65) Prior Publication Data

US 2022/0024721 A1 Jan. 27, 2022

(30) Foreign Application Priority Data

Dec. 21, 2018 (EP) .................................... 18215591

(51) Int. Cl.
*B66B 5/18* (2006.01)

(52) U.S. Cl.
CPC ..................................... *B66B 5/18* (2013.01)

(58) Field of Classification Search
CPC .... B66B 1/32; B66B 5/24; B66B 5/02; B66B 5/18; B66B 5/16; B66B 5/20; F16D 63/009
See application file for complete search history.

(56) References Cited

U.S. PATENT DOCUMENTS 9,457,990 B2 * 10/2016 Osmanbasic ............. B66B 5/20
9,663,326 B2 * 5/2017 Osmanbasic ............. B66B 5/18
(Continued)

FOREIGN PATENT DOCUMENTS

AT 514822 A1 4/2015
CN 1796261 A 7/2006
(Continued)

OTHER PUBLICATIONS

Machine translation of WO 2013083430 A1 (Year: 2013).*

*Primary Examiner* — Michael R Mansen
*Assistant Examiner* — Michelle M Mudwilder
(74) *Attorney, Agent, or Firm* — William J. Clemens; Shumaker, Loop & Kendrick, LLP

(57) ABSTRACT

An elevator system arrangement includes a car, a brake strip and an elevator brake device for braking the car on the brake strip, preferably on a brake strip integrated in a guide rail. The elevator brake device includes: a brake housing displaceably mounted in the elevator brake device and is held in a standby position by an applied force, a brake body movably arranged on the brake housing and designed to clamp the brake strip, a pusher arranged on the brake housing so that the brake strip can be arranged between the brake body and the pusher, wherein, when the elevator brake device installed, the distance from the car-side delimitation plane of the elevator brake device to the end face of the brake strip is less than 70% of the distance from the car-side delimitation plane of the elevator brake device to the car-remote plane.

13 Claims, 4 Drawing Sheets

(56) References Cited

U.S. PATENT DOCUMENTS

| | | | | |
|---|---|---|---|---|
| 9,745,171 | B2 * | 8/2017 | Husmann | B66B 5/20 |
| 2006/0180406 | A1 | 8/2006 | Gremaud et al. | |
| 2007/0007083 | A1 * | 1/2007 | Husmann | B66B 5/20 187/366 |
| 2010/0038184 | A1 * | 2/2010 | Emmerich | B66B 5/18 187/359 |
| 2012/0152663 | A1 | 6/2012 | Legeret et al. | |
| 2013/0081907 | A1 | 4/2013 | Meierhans et al. | |
| 2013/0081908 | A1 | 4/2013 | Meierhans et al. | |
| 2015/0329322 | A1 * | 11/2015 | Osmanbasic | B66B 5/046 187/373 |
| 2016/0311652 | A1 * | 10/2016 | Osmanbasic | B66B 5/0093 |
| 2017/0291793 | A1 * | 10/2017 | Bitzi | F16D 63/008 |

FOREIGN PATENT DOCUMENTS

| | | | | |
|---|---|---|---|---|
| CN | 103261075 | A | 8/2013 | |
| CN | 103648953 | A | 3/2014 | |
| CN | 103648954 | A | 3/2014 | |
| CN | 103987644 | A | 8/2014 | |
| CN | 104986641 | A | 10/2015 | |
| EP | 0899231 | A1 | 3/1999 | |
| EP | 1400476 | A1 | 3/2004 | |
| EP | 2788271 | A1 | 10/2014 | |
| EP | 2788271 | B1 | 4/2015 | |
| EP | 2760776 | B1 | 6/2015 | |
| EP | 2651808 | B1 | 3/2016 | |
| JP | 407330246 | A | 12/1995 | |
| JP | 2874558 | B2 | 3/1999 | |
| KR | 100889280 | B1 | 3/2009 | |
| WO | 0039016 | A1 | 7/2000 | |
| WO | 2011146050 | A1 | 11/2011 | |
| WO | WO-2012128758 | A1 * | 9/2012 | B66B 1/365 |
| WO | 2013083430 | A1 | 6/2013 | |
| WO | 2017050647 | A1 | 3/2017 | |
| WO | 2018153650 | A1 | 8/2018 | |

* cited by examiner

ELEVATOR SYSTEM ARRANGEMENT HAVING AN ELEVATOR BRAKE DEVICE

FIELD

The invention relates to an elevator system arrangement comprising an elevator brake device for braking an elevator car on a brake strip.

BACKGROUND

Application EP 2 788 271 (see WO 2013/083430 A1) discloses a brake device for an elevator system. In this elevator system, a car is arranged so as to be movable along guide rails and the car is equipped with a brake system having preferably two elevator brake devices. The elevator brake device is provided for braking a car on a brake strip, preferably on a brake strip integrated into a guide rail. The elevator brake device includes a brake housing and a brake body. Said body is movably arranged on the brake housing and is designed to be moved with the brake strip upon contact with the brake strip and a relative movement between the brake strip and the brake housing. As a result, the brake strip is clamped and the brake housing is tensioned. The elevator brake device further includes a pusher which is arranged on the brake housing so that the brake strip can be arranged with the necessary clearance between the brake body and the pusher. If necessary, the pusher can be advanced in the direction of the brake body and pressed against the brake strip which can be arranged between the brake body and the pusher. As a result, the brake body is inevitably also brought into contact with the brake strip. The elevator brake device also includes a pressure lever which is pivotally mounted on the brake housing and which, if necessary, acts on the pusher in order to press it against the brake strip and bring the brake body into contact with the brake strip.

There is also a drive in the elevator industry to reduce the depth of the pit and the height of the shaft head. If, for example, an elevator is to go to the lowest floor of a building, a pit that goes far below the level of the lowest floor must usually be dug. This is expensive and not always possible. Reducing these spaces allows installation in buildings that would otherwise not have an elevator.

SUMMARY

An object of the invention is in particular to provide an elevator system which can be operated safely and of which the brake device can be easily placed next to the car due to its thin design. As a result, no space is required beneath the car and the shaft pit can be designed to be smaller than if the brake devices also had to be placed beneath the car.

The elevator system arrangement according to the invention comprises a car, a brake strip and an elevator brake device which is used to brake the car on the brake strip. For this purpose, the elevator brake device comprises a brake housing which is horizontally displaceably mounted in the elevator brake device and can be held in a standby position by an applied force. Furthermore, the elevator brake device comprises a brake body which is movably arranged on the brake housing and which is designed to be displaced or rotated upon contact with the brake strip and thus to clamp the brake strip. Furthermore, the elevator brake device comprises a pusher which is arranged on the brake housing so that the brake strip can be arranged between the brake body and the pusher. In this case, in the standby position, a distance between the brake body and the pusher corresponds at least to a thickness of the brake strip plus a necessary clearance between the brake body, the brake strip and the pusher. The pusher can be advanced in the direction of the brake body, substantially along a line of action extending perpendicularly to the brake strip. The pusher can be pressed against the brake strip which can be arranged between the brake body and the pusher. The elevator brake device is characterized in that a reference plane is spanned by the line of action and a direction of travel. A car-remote plane is thus defined which is oriented in parallel with the reference plane and which is displaced to such an extent that the entire elevator brake device is located on the car side of the car-remote plane and the car-remote plane touches the elevator brake device. In addition, a car-side plane is defined which is oriented in parallel with the reference plane and which is displaced to such an extent that the entire elevator brake device is located on the car-remote side of the car-side plane and the car-side plane touches the elevator brake device. When the elevator brake device is installed, the distance from the car-side plane to the brake strip is less than 70% of the distance from the car-side plane to the car-remote plane. In particular, when the elevator brake device is installed, the distance from the car-side plane to the brake strip is less than 50% of the distance from the car-side plane to the shaft-wall-side plane. Most particularly, when the elevator brake device is installed, the distance from the car-side plane to the brake strip is less than 30% of the distance from the car-side plane to the car-remote plane.

Advantageously, the brake strip is integrated in the guide rail in the elevator system arrangement.

The advantage of such an elevator system arrangement lies in the thin design of the catch device. This makes it possible to use this elevator brake device next to the car with minimal loss of usable space in the car. This means that the elevator brake device is located substantially next to the car. In a vertical projection of the car, the elevator brake device is substantially next to the floor structure of the car, i.e. to the side of the accessible floor in the car. The space that is usually reserved for the elevator brake device beneath the car or, more rarely, above the car, is therefore not required. The pit depth or the shaft head height can therefore be correspondingly smaller. This is particularly advantageous if a building is to be retrofitted with an elevator that extends to the lowest floor. Since in such a case no pit or a significantly smaller pit is required, the installation is easier and cheaper.

The distance between the car-side plane and the brake strip is preferably less than or equal to 29 mm.

A distance between a plane and a body, for example the brake strip, is defined as the smallest distance that can be measured between the surface of the body and the plane. This distance is measured perpendicularly to the plane. In the case of the distance to the brake strip, this distance typically corresponds to the distance from the plane to the flat end face of the brake strip, which is usually aligned in parallel with the plane. The distance thus typically corresponds to the distance between two planes.

The elevator system arrangement preferably comprises two brake devices on a car and likewise preferably two brake devices on a counterweight. The car is used to transport goods and/or people. The counterweight is used to balance the weight of the empty car and part of the load in the car. The car and the counterweight are preferably connected to a main drive via a suspension means.

The car is preferably guided along the guide rails, which preferably extend vertically in the shaft.

The brake housing, which is displaceably mounted in the elevator brake device, can preferably be displaced in the horizontal direction. The horizontal displacement either reduces the clearance between the brake strip and the brake body or reduces the clearance between the brake strip and the pusher or the brake pad. Preferably, a position of the brake housing in which both parts of the clearance are sufficiently large is maintained by having a positioning spring for each direction which pushes the brake housing toward this position.

The brake body is movably arranged on the brake housing and is designed to be moved with the brake strip upon contact with the brake strip and a relative movement between the brake strip and the brake housing.

The pusher refers to the body or part of a body that is suitable for pressing on the brake strip. It can therefore be a roller, a set of rollers, a sliding layer or even just a surface contour.

The pusher can be advanced in the direction of the brake body, substantially along a line of action extending perpendicularly to the brake strip, from a position at a distance from the brake strip in the standby position to the brake strip, in order to press further against the brake strip in order to thus laterally displace the brake housing and bring the brake body into contact with the brake strip.

"Car side" refers to the side of the elevator brake device which faces away from the rail, or an alignment perpendicular thereto which substantially points in the direction of the car. The elevator brake device is usually fastened to the car on this side. This alignment is perpendicular to the direction of movement of the car in the elevator arrangement and perpendicular to the line of action. "Car-remote side" refers to the opposite alignment to "car side."

The brake body is preferably designed in the form of an eccentric which can be rotated about an axis and of which the contour is designed in such a way that, as a result of the eccentric moving along with the brake strip, the eccentric presses even harder on the brake strip. Preferably, the eccentric is designed in such a way that it has a contour which, by rotating the eccentric about its bearing axis, initially reduces the distance between the eccentric and the brake strip and, on further rotation, is able to push the brake strip away.

Alternatively, the brake body can also be designed in the form of a catch wedge which is fed to the rail substantially linearly at a small angle to the surface of the brake strip.

Advantageously, the elevator brake device also includes a pressure lever which is pivotally mounted on the brake housing and which, if necessary, acts on the pusher in order to press it against the brake strip, in order to laterally displace the brake housing and bring the brake body into contact with the brake strip.

The pressure lever, which is designed as a lever, for example, is preferably connected to the brake housing. A bearing point between the pressure lever and the brake housing allows a relative rotation about a pivot pin.

Preferably, the pressing of the pusher against the brake strip at the bearing point causes a resultant force on the brake housing, as a result of which the brake housing is displaced laterally. The lateral displacement then brings the brake body into contact with the brake strip. The brake housing is then preferably pushed back against the previous movement by the jamming of the brake body. As a result, the brake body presses the brake strip against the brake pad.

The pivot pin of the pressure lever is advantageously aligned horizontally.

The pivot pin of the pressure lever is advantageously oriented perpendicularly to the line of action. This pivot pin is preferably oriented perpendicularly to the end face of the brake strip.

In comparison with EP 2 788 271, the alignment of the pivot pin is advantageous here. In EP 2 788 271, the horizontal distance between the end face and the location at which the pusher presses on the brake strip changes during the advancing. In extreme cases, the pusher could even push past the brake strip. In the solution proposed here, the change in the location at which the pusher presses takes place in the direction of the extension of the brake strip. The horizontal distance between the end face and the location at which the pusher presses on the brake strip thus does not change during the advancing. In addition, this is the same direction in which the roller is already rolling.

Advantageously, the pressure lever is located completely on the car-remote side of a plane which is oriented in parallel with the reference plane and which is displaced to such an extent that the entire brake strip is located on the car-remote side of this plane and this plane touches the brake strip.

This has the advantage that the elevator brake device can be made particularly thin. Due to the specific arrangement of the components, it is possible to place the moving parts next to the brake strip so the car wall can be arranged very close to the brake strip.

The elevator brake device is advantageously located at least partially above a floor plane.

The floor plane is the plane on which the passengers or the payload stand and which is aligned, without steps, with the floors that are approached.

The very narrow design leaves more space for the car, and thus for the passengers in the car, than if additional space had to be provided between the car and the rail for a conventional catch device.

The elevator brake device advantageously protrudes less than 50 mm below the floor plane.

The elevator brake device preferably does not protrude further below the floor plane than the vertical extension of a floor structure. As a result, the required depth of the shaft pit is determined by the thickness of the car floor alone, and not by the components of the elevator brake device.

Advantageously, the energy for advancing the pusher comes from multiple springs. The redundancy of the springs increases safety. Even if one spring should break, the elevator brake device can be reliably triggered.

Advantageously, the pressure lever is held by a releasable holding device, and the holding force of the holding device can be generated electromagnetically.

Preferably, an electromagnet of the holding device generates an electromagnetic field, which then generates the holding force in interaction with a ferromagnetic plate, and thus holds the pressure lever.

The pressure lever advantageously has a plate or flat surface which can be brought into contact with an electromagnet of the holding device. When the electromagnet is activated, the plate or the flat surface is held by the electromagnet, i.e. by an electromagnetically generated holding force.

An electromagnet generates a magnetic field that exerts an attractive force on paramagnetic and magnetic materials.

It would of course also be conceivable to attach the electromagnet to the pressure lever and to attach a plate or flat surface to the holding device; the pressure lever is also held in this case by a holding device.

The advantage of such an embodiment is that the magnet can be released electronically. This allows a quick reaction and more reliable triggering of the elevator brake device.

The detection of situations that require the catch device to be triggered can be left to a centralized or decentralized control unit. This monitors the elevator system arrangement and triggers the elevator brake device where necessary. One advantage of electronic triggering is therefore that expensive mechanical speed limiters that take up a lot of space can be dispensed with.

Advantageously, the holding device is movably mounted, and the pressure lever touches the holding device after the catch has taken place.

This has the advantage that the elevator brake device is immediately ready for use again. The readiness for triggering is restored by switching on the power supply to the electromagnet and lifting the traveling body out of the catch.

While the brake body moves or rotates in order to clamp the brake strip, the brake strip is displaced to the side. Since the brake strip is pushed to the side by the brake body in the triggered state, the pusher is also pushed to the side, and the pressure lever is brought not only into its starting position, but even slightly beyond it. In order for the pressure lever to be able to do this, the holding device has the ability to resiliently pivot away. After the catch has taken place, the contact surface is brought into contact with the holding device again and the springs are also tensioned again. As a result, the brake device can be brought back into a standby position very easily. For this purpose, preferably only the holding device is activated again, and the car is lifted out of the catch by means of a main drive. Thus, neither a reset motor nor a directly active actuator is necessary to re-tension the springs of the elevator brake device and to bring the plate and the electromagnet back into contact.

Advantageously, the holding device is movably mounted. Depending on the condition of the brake pad and the severity of the braking process, the pusher is moved back to a varying extent in the direction of the standby position. The movable mounting now allows the contact surface not only to move until it comes into contact with the holding device, but also to continue the movement beyond this position, while still remaining in contact with the holding device, but without damaging the pusher, the pressure lever or the holding device.

The pusher advantageously has a roller for rolling on the brake strip.

The pusher is preferably designed as a roller, as a result of which the force that occurs between the pusher and the brake strip when required is substantially perpendicular to the braking surface of the brake strip. Alternatively, the same goal can also be achieved by designing the pusher as a smoothly sliding layer.

The pusher refers to the body or part of a body that is suitable for pressing on the brake strip. It can therefore be a roller, a set of rollers, a sliding layer, a skid, or even just a suitable convex surface contour.

Advantageously, the elevator brake device has a pair of positioning springs which are designed to ensure that the clearance with respect to the brake strip is ensured in the non-triggered state.

This is advantageous because the positioning springs hold the brake housing in a position that does not allow unnecessary contact with the brake strip. This allows the elevator system arrangement to function quietly and with little disruption. During the triggering process, the positioning springs allow the brake housing to be pressed first to one side by the pressure lever and then to the other side by the brake body.

In the context of this document, the distance between two geometric units is defined as being the shortest possible route that connects a point on one body to a point on the other body.

DESCRIPTION OF THE DRAWINGS

Further advantages, features and details of the invention can be found in the following description of embodiments and with reference to the drawings, in which like or functionally like elements are provided with identical reference signs. The drawings are merely schematic and not to scale.

In the drawings.

DETAILED DESCRIPTION

Figure 1:
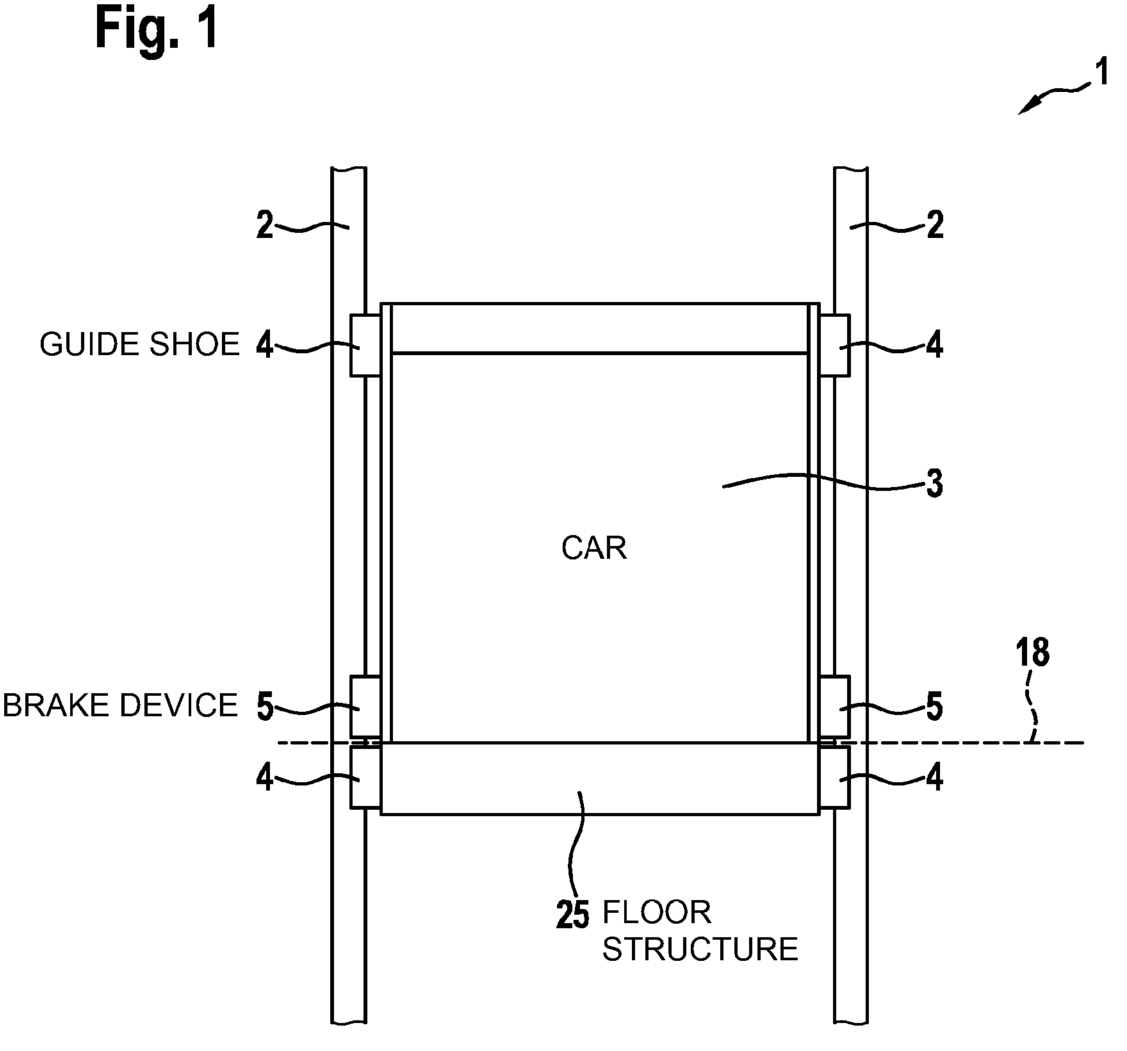
FIG. 1 is a schematic view of the elevator system arrangement from the side.

FIG. 1 shows an elevator system arrangement 1 which comprises two elevator brake devices 5. A car 3 is mounted so as to be movable along two guide rails which, in this example, also comprise the brake strips 2. The car 3 is guided on the guide rails via guide shoes 4. In this elevator system arrangement 1, the elevator brake devices 5 are arranged completely above the floor plane 18 in the car 3. The floor plane 18 refers to the area on which a passenger or the payload stands in the car 3. The floor structure 25, which absorbs the forces of the passengers or the payload, is located below the floor plane 18.

Figure 2:
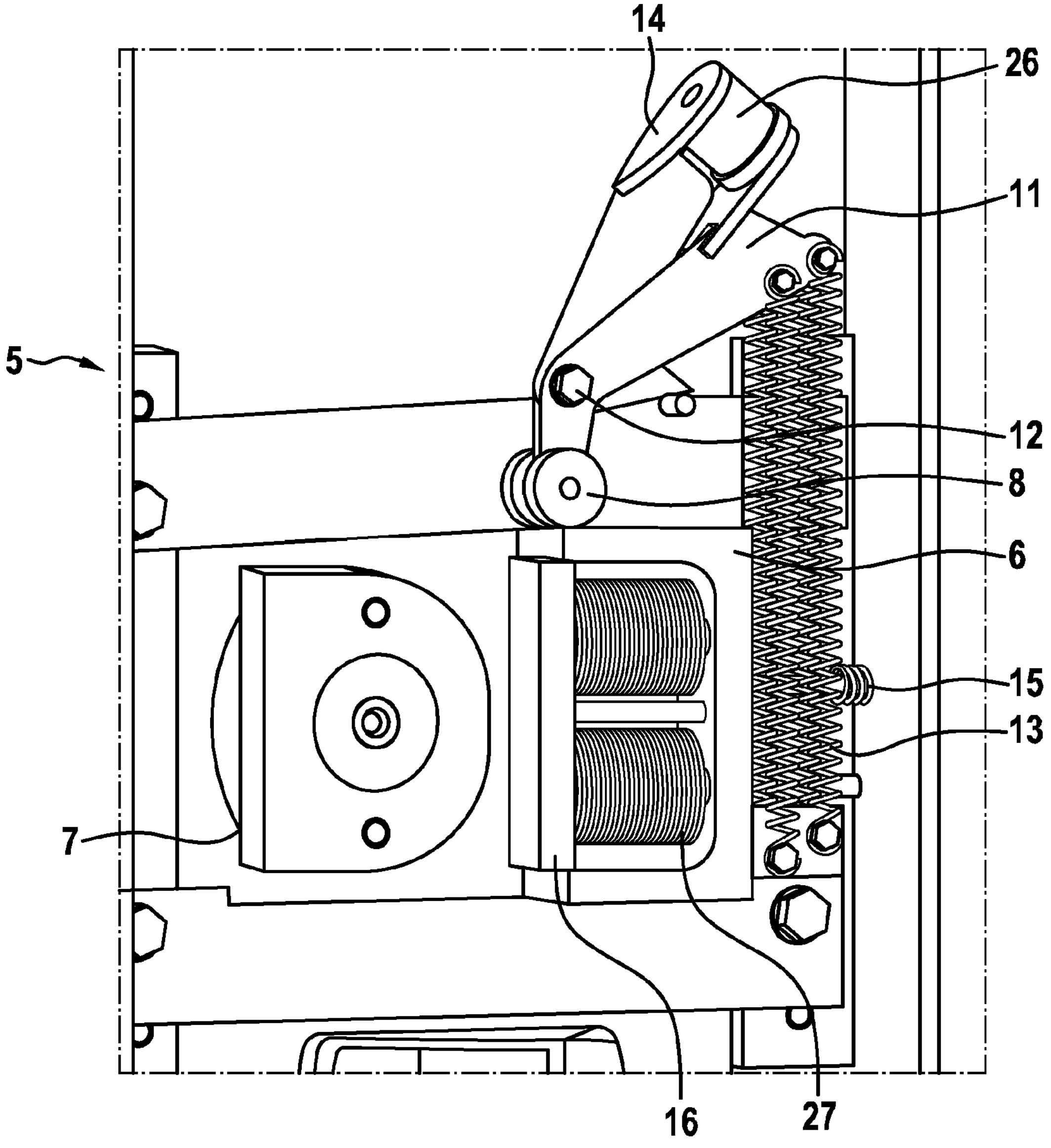
FIG. 2 is an isometric view of the elevator brake device.
Figure 3:
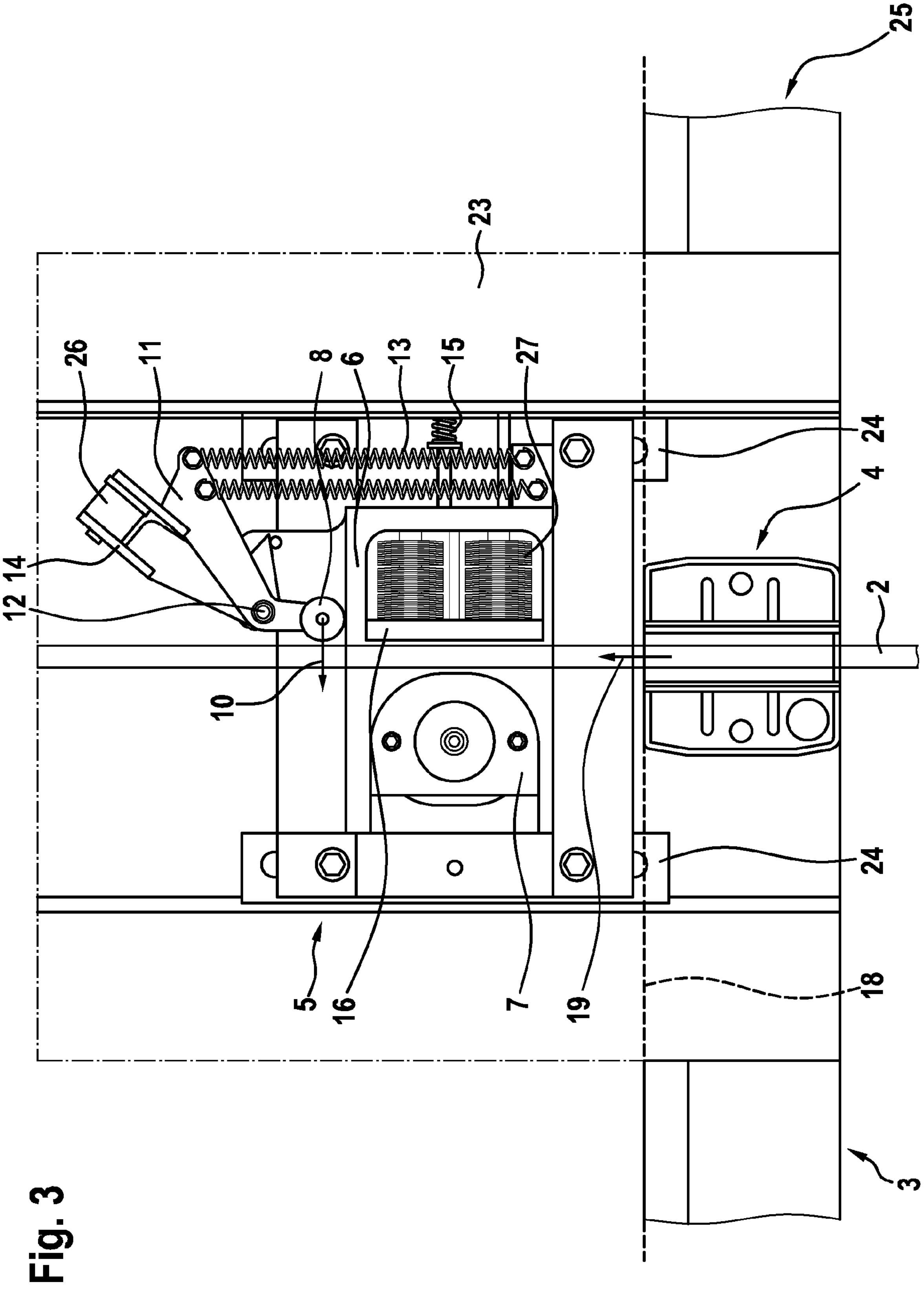
FIG. 3 is a horizontal projection of the elevator brake device including the brake strip and part of the car.
Figure 4:
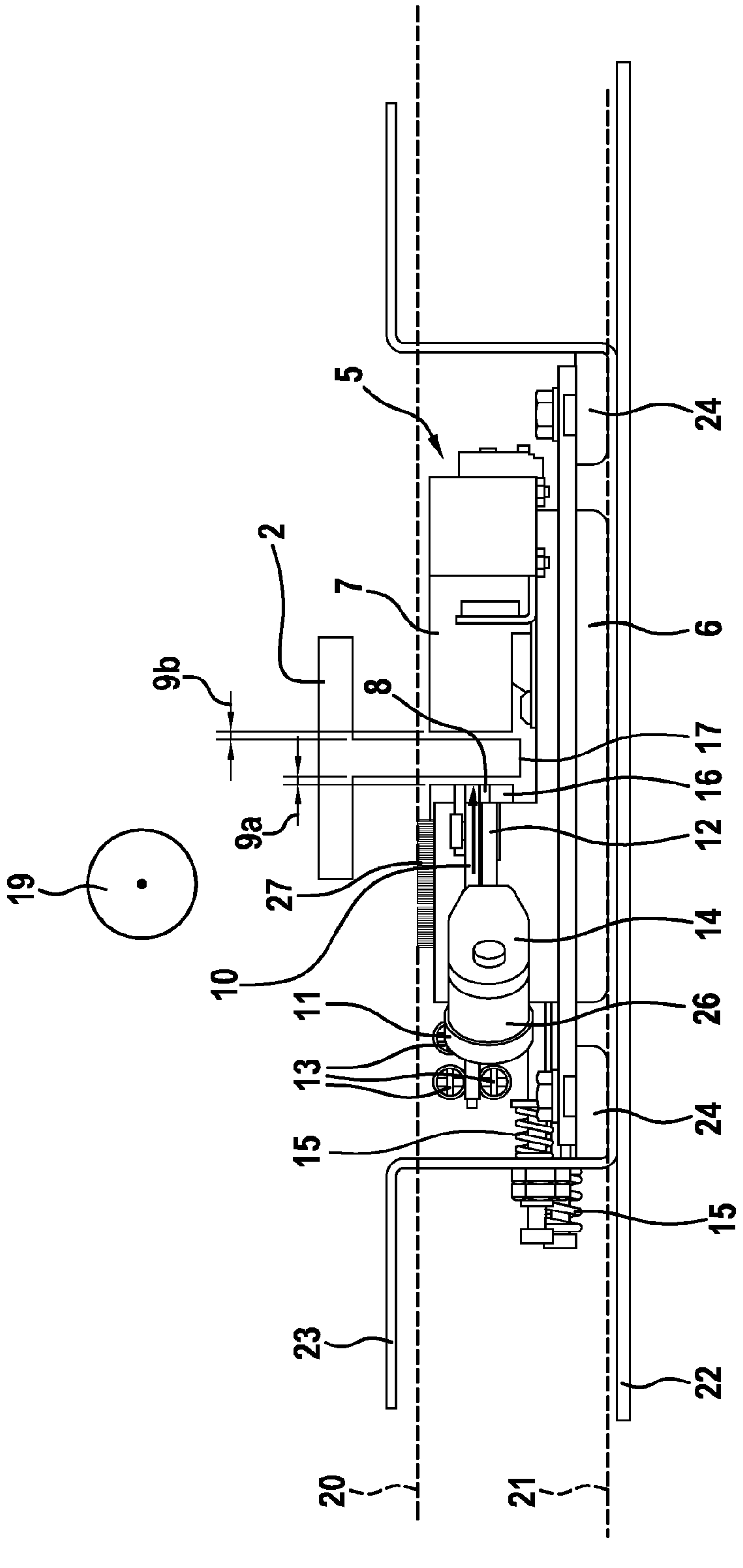
FIG. 4 is a vertical projection of the elevator brake device including the brake strip and part of the car.

FIGS. 2, 3 and 4 show the same embodiment of the invention. FIG. 2 shows an isometric view of the elevator brake device 5. For better visibility of the components, the brake strip 2 is not shown in this view. FIG. 3 is a horizontal view of the same elevator brake device 5, in which the brake strip 2 is also shown schematically. FIG. 4 is a vertical view of the same elevator brake device 5, in which the brake strip 2 is also shown.

FIGS. 2, 3 and 4 show the elevator brake device 5 in the standby position. This is the normal operating position of the elevator brake device 5 and allows normal operation of the elevator system 1. The elevator brake device 5 is fastened to a side plate 23 of the car 3 via fastening rails 24 which are part of the elevator brake device 5. A brake housing 6 is laterally displaceably mounted in the fastening rails 24. A pressure lever 11, a brake pad 16 and a brake body 7 are all fastened to the brake housing 6 in this embodiment. The pressure lever 11 is in contact with a holding device 14 and is held thereby in the standby position. The pressure lever 11 has a pusher 8, which in this example consists of rollers.

In the embodiment shown, the holding device 14 includes an electromagnet 26 which is designed to hold the pressure lever 11 on a contact surface. The pressure lever 11 is acted upon by four tensioned springs 13. The holding device 14 is able to hold these spring forces. Because the pressure lever 11 is held by the holding device 14, the pusher 8 can be kept at a distance from the brake strip 2 by at least one clearance 9*a*. Because the brake housing 6 is centered by the positioning springs 15, the brake pad 16, which in this embodiment is supported by two sets of disk springs 27, is also kept at a distance from the brake strip 2 by at least one clearance 9*a*. The brake body 7 is located on the other side of the brake strip 2.

Because the brake housing 6 is centered by the positioning springs 15, the brake body 7 is kept at a distance from the brake strip 2 by a clearance 9*b*. In order for the brake housing 6 to be held in a horizontal target position, the brake housing 6 is resiliently held in a central position by the positioning springs 15. As a result, the clearance 9*a*, 9*b* is maintained. The positioning springs 15 and the clearance can be clearly seen in FIG. 4.

A pivot pin 12 of the pressure lever 11 is aligned perpendicularly to the line of action 10 and horizontally in FIG. 2. This has the advantage that the advancing process of the pusher 8 takes place in a plane parallel to the car wall. As a result, the pusher 8 does not change its position and alignment relative to the end face of the brake strip during the advancing. This has the advantage that the pusher 8 always presses on the brake strip 2 in a desired region. It is thus ensured that the pusher always presses reliably on and not next to the brake strip if the pusher 8 presses against the brake strip 2.

In particular, if the pusher 8 is designed as a roller, the roller is loaded only by radial forces in this type of construction. If the pivot pin 12 were aligned vertically, for example, as in EP 2 788 271, the rollers would be pressed onto the brake strip 2 at different angles and the point of contact with the brake strip 2 would also change its distance from the end face of the brake strip 2.

In order to avoid the advancing of the pusher 8 being disturbed by possible frictional forces between the pusher 8 and the brake strip 2, it is advantageous to keep these frictional forces as small as possible. For this purpose, the pusher 8 in FIG. 2 is designed as a pair of rollers. However, the pusher 8 could also be designed simply as a smoothly sliding contact surface with respect to the brake strip 2.

In addition to the general description, FIG. 3 also shows a guide shoe 4, a side plate 23 of the car and, purely schematically, part of the floor structure 25 of the car 3. The elevator brake device 5 is located at least partially above a floor plane 18. In FIG. 3, even the essential part of the elevator brake device 5 is located above the floor plane 18. Only the two fastening rails 24 protrude slightly below the floor plane 18. However, said rails protrude less than 50 mm below the floor plane 18 and remain in the region of the vertical extension of the floor structure 25.

The car 3 is moved along the guide rails. The guide rails, which in this example contain the brake strip 2, extend through the guide shoe 4 and between the brake pad 16 and the brake body 7. The direction of travel 19 is indicated as being upward, but of course also includes a downward direction of travel.

The force that the pusher 8 exerts on the brake strip when required acts substantially along the line of action 10. Since the pusher 8 is designed as a pair of rollers, no significant frictional force components can arise. If the pusher 8 were designed only as a sliding layer, the force would also contain frictional force components.

The side plate 23 covers part of the positioning springs 15 in FIG. 3. The positioning springs 15 can be clearly seen in FIG. 4.

In FIG. 4, the characterizing feature of the invention is shown by way of example. The car-remote plane 20 is the plane which is aligned in parallel with a plane which is spanned by the line of action 10 and a direction of travel 19, and is displaced so far away from the car wall 22 that the elevator brake device 5 is just touched. The car-side plane 21 is the plane which is aligned in parallel with a plane which is spanned by the line of action 10 and a direction of travel 19, and is displaced so far toward the car wall 22 that the elevator brake device 5 is just touched. The elevator brake device 5 is therefore located completely between the car-side plane 21 and the car-remote plane 20.

The elevator brake device 5 can be triggered electronically. Typically, a power supply unit supplies power to the electromagnet 26 and the elevator brake device 5 can thus be held in the standby position. The elevator system arrangement has a centralized or decentralized control unit. This control unit monitors the elevator system arrangement and triggers the elevator brake device where necessary by the current through the electromagnet 26 being switched off via the power supply unit.

One advantage of electronic triggering is that expensive mechanical speed limiters that take up a lot of space can be dispensed with. As soon as it is determined in the elevator system, for example in a control device, that the elevator brake device 5 is to be triggered, this information is transmitted electronically to the holding device 14.

As soon as the power supply to the electromagnet 26 is interrupted by the control unit, the pressure lever 11, which is loaded by springs 13 under tension, is released from the holding device 14. The pressure lever 11 rotates about the pivot pin 12 of the pressure lever 11 so that the pusher 8 initially eliminates the clearance 9*a* with respect to the brake strip 2. The pusher 8 then pushes the entire brake housing 6 to the side—to the left in FIG. 4—via the pivot pin 12. This now also reduces the clearance 9*b*. When the brake body 7 touches the brake strip 2, this part of the brake body 7 is carried along. As a result, the brake body 7 performs a rolling-in movement and it presses increasingly harder against the brake strip 2. As a result of the rolling-in movement, the brake housing 6 is now displaced to the other side, i.e. to the right in FIG. 4. As a result, the brake lever 11 is turned back again via the pusher 8, the springs 13 are tensioned again, and the contact surface is brought back into contact with the holding device 14. The brake housing is displaced even further until the brake pad 16 is then pressed against the brake strip 2 with great clamping force, thereby generating the actual braking force. The brake strip 2 is now clamped between the brake pad 16 and the brake body 7 and the resulting frictional forces cause a braking force. The holding device 14 is resiliently mounted and allows the pressure lever 11 to be rotated further beyond the standby position.

The total clearance, which results from the sum of the clearances 9*a* and 9*b*, is predetermined by the design of the elevator brake device 5. The distribution of the total clearance 9*a*, 9*b* over the two clearances 9*a* and 9*b* can be set by adjusting the lock nuts on the positioning springs 15 and readjusted if necessary.

The alignment of the pivot pin 12 means that the distance between the pusher 8 and the end face 17 of the brake strip 2 remains substantially constant. This ensures that the braking process is carried out safely, since the pusher 8 cannot press next to the brake strip 2, nor can the rolling direction of the rollers of the pusher 8 deviate from the direction of travel 19.

The elevator brake device 5 is fastened to the side plate 23 via the two fastening rails 24.

In FIG. 4, the positioning springs 15 are supported on the side plate 23 of the car. Of course, it would also be possible for this support to act against a component of the elevator brake device 5 or against another part of the car 3.

Finally, it should be noted that terms such as "comprising," "having," etc. do not preclude other elements or steps and terms such as "a" or "an" do not preclude a plurality. It should also be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system arrangement including a car, a brake strip and an elevator brake device for braking the car on the brake strip, the elevator brake device comprising:

- a brake housing horizontally displaceably mounted in the elevator brake device and in a standby position by an applied force;
- a brake pad that is supported on the brake housing by at least one spring;
- a brake body movably arranged on the brake housing and is displaceable or rotatable upon contact with the brake strip to clamp the brake strip between the brake body and the brake pad;
- a pusher arranged on the brake housing such that the brake strip can be arranged between the brake body and the pusher;
- wherein, in the standby position of the brake housing, a distance between the brake body and the pusher corresponds at least to a thickness of the brake strip plus a first clearance between the brake body and the brake strip and a second clearance between the pusher and the brake strip;
- wherein the pusher is adapted to be advanced in a direction of the brake body along a line of action extending perpendicularly to the brake strip to press the pusher against the brake strip when the brake strip is arranged between the brake body and the pusher;
- wherein the line of action and a direction of travel of the car lie in a reference plane;
- a car-remote plane is oriented in parallel with the reference plane such the elevator brake device is entirely located on a car side of the car-remote plane and the car-remote plane touches the elevator brake device, and a car-side plane is oriented in parallel with the reference plane and such that the elevator brake device is entirely located on a car-remote side of the car-side plane and the car-side plane touches the elevator brake device;
- when the elevator brake device is installed on the car, a distance from the car-side plane to the brake strip less than 70% of a distance from the car-side plane to the car-remote plane;
- a pressure lever pivotally mounted on the brake housing and acting on the pusher during a braking process to press the pusher against the brake strip thereby laterally displacing the brake housing and bringing the brake body into contact with the brake strip; and
- wherein the pressure lever includes a pivot pin aligned horizontally relative to a vertical direction of travel of the car.

2. The elevator system arrangement according to claim 1 wherein when the elevator brake device is installed on the car, the distance from the car-side plane to the brake strip less than 30% of a distance from the car-side plane to the car-remote plane.

3. The elevator system arrangement according to claim 1 wherein the pivot pin is oriented perpendicularly to the line of action.

4. The elevator system arrangement according to claim 1 wherein the pressure lever is located completely on the car-remote side of a plane that is oriented in parallel with the reference plane such that the brake strip is located entirely on the car-remote side of the plane and the plane touches the brake strip.

5. The elevator system arrangement according to claim 1 including a releasable holding device holding the pressure lever in the standby position.

6. The elevator arrangement according to claim 5 wherein the holding device holds the pressure lever with a force generated electromagnetically.

7. The elevator system arrangement according to claim 5 wherein the holding device is movably mounted on the brake housing and the pressure lever touches the holding device after a catch of the brake strip has taken place.

8. The elevator system arrangement according to claim 1 wherein the elevator brake device is located at least partially above a floor plane of the car.

9. The elevator system arrangement according to claim 1 wherein the elevator brake device protrudes less than 50 mm below a floor plane of the car.

10. The elevator system arrangement according to claim 1 including at least one spring connected to advance the pusher in the direction of the brake body.

11. The elevator system arrangement according to claim 1 wherein the pusher has a roller for rolling on the brake strip.

12. The elevator system arrangement according to claim 1 including positioning springs adapted to ensure that the first and second clearances are maintained in a non-triggered state of the elevator brake device.

13. An elevator system arrangement including a car, a brake strip and an elevator brake device for braking the car on the brake strip, the elevator brake device comprising:

- a brake housing horizontally displaceably mounted in the elevator brake device and in a standby position by an applied force;
- a brake pad that is supported on the brake housing by at least one spring;
- a brake body movably arranged on the brake housing and is displaceable or rotatable upon contact with the brake strip to clamp the brake strip between the brake body and the brake pad;
- a pusher arranged on the brake housing such that the brake strip can be arranged between the brake body and the pusher;
- wherein, in the standby position of the brake housing, a distance between the brake body and the pusher corresponds at least to a thickness of the brake strip plus a first clearance between the brake body and the brake strip and a second clearance between the pusher and the brake strip;
- wherein the pusher is adapted to be advanced in a direction of the brake body along a line of action extending perpendicularly to the brake strip to press the pusher against the brake strip when the brake strip is arranged between the brake body and the pusher;
- wherein the line of action and a direction of travel of the car lie in a reference plane;
- a car-remote plane is oriented in parallel with the reference plane such the elevator brake device is entirely located on a car side of the car-remote plane and the car-remote plane touches the elevator brake device, and a car-side plane is oriented in parallel with the reference plane and such that the elevator brake device is entirely located on a car-remote side of the car-side plane and the car-side plane touches the elevator brake device;

when the elevator brake device is installed on the car, a distance from the car-side plane to the brake strip less than 70% of a distance from the car-side plane to the car-remote plane;

a pressure lever pivotally mounted on the brake housing and acting on the pusher during a braking process to press the pusher against the brake strip thereby laterally displacing the brake housing and bringing the brake body into contact with the brake strip; and wherein the pressure lever is located completely on the car-remote side of a plane that is oriented in parallel with the reference plane such that the brake strip is located entirely on the car-remote side of the plane and the plane touches the brake strip.

* * * * *